(12) United States Patent
Wu

(10) Patent No.: US 9,905,945 B2
(45) Date of Patent: Feb. 27, 2018

(54) CONNECTOR MODULE AND CONNECTOR BLADE THEREOF

(71) Applicant: Dinkle Enterprise Co., Ltd., New Taipei (TW)

(72) Inventor: Shang-Tsai Wu, New Taipei (TW)

(73) Assignee: DINKLE ENTERPRISE CO., LTD., New Taipei (TW)

( * ) Notice: Subject to any disclaimer, the term of this patent is extended or adjusted under 35 U.S.C. 154(b) by 0 days.

(21) Appl. No.: 15/497,790

(22) Filed: Apr. 26, 2017

(65) Prior Publication Data

US 2017/0317436 A1    Nov. 2, 2017

(30) Foreign Application Priority Data

May 2, 2017    (TW) .............................. 105113333 A

(51) Int. Cl.
*H01R 9/24*    (2006.01)
*H01R 4/24*    (2018.01)
*H04Q 1/02*    (2006.01)

(52) U.S. Cl.
CPC ......... *H01R 9/2425* (2013.01); *H01R 4/2429* (2013.01); *H04Q 1/155* (2013.01); *H04Q 2201/04* (2013.01)

(58) Field of Classification Search
CPC .. H01R 9/2425; H01R 12/675; H01R 4/2433; H01R 4/2429
See application file for complete search history.

(56) References Cited

U.S. PATENT DOCUMENTS

| | | |
|---|---|---|
| 5,716,241 A | 2/1998 | Hennemann et al. |
| 7,402,058 B2 | 7/2008 | Hoemann et al. |
| 7,722,404 B2 * | 5/2010 | Neumetzler ......... H01R 13/422 439/404 |
| 8,968,016 B1 | 3/2015 | Wu |
| 2013/0027890 A1 | 1/2013 | Berger et al. |

FOREIGN PATENT DOCUMENTS

WO    WO 00/62376    10/2000

* cited by examiner

*Primary Examiner* — Ross Gushi
(74) *Attorney, Agent, or Firm* — Muncy, Geissler, Olds & Lowe, P.C.

(57) ABSTRACT

Disclosed is a novel connector module structure, to be installed in a system to form connection between at least two functional modules. The connector module provides jumper connection capabilities, i.e., allowing one of its connection terminals to form electrical connection with a connection terminal of one or more particular non-adjacent connector modules.

23 Claims, 4 Drawing Sheets

CONNECTOR MODULE AND CONNECTOR BLADE THEREOF

RELATED APPLICATIONS AND PRIORITY CLAIMS

This non-provisional application claims priority benefit from Taiwan patent application filing number 105113333, filed on Apr. 28, 2016, the disclosure of which is incorporated herein by reference in its entirety.

BACKGROUND

1. Technical Field

The present invention relates to a connector module, and more particularly to a connector module for providing a jumper connection capability, and a blade for providing the jumper connection capability.

2. Related Art and Problems being Solved

In the control systems used in the industry, the various control circuits are usually provided in the form of a functional module, whereby a general system can serve different functionalities simply by replacing, adding or removing a related function module in/from the system. In order to be easily inserted into or removed from a control system, each functional module is formed on a circuit board and provides a connector array in the circuit board. The connector array provides a predetermined number of contact pins at particular positions, exposed from the housing of the functional module, so that the connector array may be inserted into a connector module provided in the control system that has a corresponding number of connection terminals disposed at corresponding positions. This type of connector usually forms so-called "gold fingers" in the circuit board side and the system-side connector module provides a connector slot in which a plurality of equally spaced connection terminals are provided. Each of the connection terminals has a Y-shaped conductive piece that has two legs to provide clamping forces. At the functional module side the circuit board has a protruding connection area in which a plurality of gold fingers is provided. Usually the number of the gold fingers is the same as that of the connection terminals and the positions of the gold fingers are corresponding to that of the connection terminals. By inserting the connection area into the connector slot of the connector module, such that each gold finger is clamped by its corresponding connection terminal, the functional module and the system form an electrical connection between their circuits. The connection so formed may be easily released by removing/pulling the functional module from the connector slot. Such gold finger type of connector is well known to the industry.

In general applications, the various functional modules typically form a flat cartridge. If a same number of connection terminals are provided at the same positions on both sides of the cartridge, the functional module can form electrical connections with other functional modules that also form a cartridge on its sides, when they are arranged side by side, whereby signals and/or currents may be transmitted laterally through the said connections. U.S. Pat. No. 5,716,241 discloses an I/O device for a data bus that provides a connector module having such a lateral connection function, to be used on a modular cartridge.

In response to the design of this laterally connected functional module, a new type of connector module was later developed. The connector module provides, when used in a cartridge type functional module, the same plural number of connection terminals on both sides of the cartridge at the same positions, so that other functional modules having a connector module of the same design can form electrical connection with the said functional module on its sides. In addition, the connection terminal forms a T shape, with the vertical section being a conductive piece with two elastic legs to clamp an external connector pin, such as a gold finger printed on a circuit board. When the external connector pins are inserted into the vertical piece, the functional module to which the external connection pins are provided can form electrical contact with the T-shaped connection terminal. That is, when in the vertical piece no external contactor pin is inserted, electrical connection forms only in the lateral direction in the T-shaped connection terminal, called a short circuit; when the vertical terminal is inserted by a connector pin, the T-shaped connection terminal additionally forms electrical connection with the functional module to which the connector pin is provided. This type of connector module can be called a dual channeled connector module.

WO 00/62376A1 discloses an input/output device having removable module comprising a dual channeled connector module with a T-shaped connection terminal used in the connector module.

US patent publication US 2013/0027890 discloses a "Connection Module Being Capable of Serving a Bus," comprising a plurality of connector modules to form a bus structure.

A design that changes the connection configurations of connection terminals by inserting a foreign object into a group of connection terminals can also be found in U.S. Pat. No. 7,402,058, "Plug Connector with Short Circuit Contacts."

Although a variety of dual-channeled connector modules has been provided in the prior art, these connector modules can only form electrical connections with another connector module/functional module that is adjacent to it in a modular array. Compared to this, U.S. Pat. No. 8,968,016 discloses a connector module for functional module for use in a bus structure. The bus structure supports a plurality of functional modules and the connector modules connect the functional modules to the bus. The bus provides power and/or signal transmission functions. However, this form of connector module does not provide a jumper connection function; it forms electrical connections with all other functional modules.

Therefore, it is necessary to provide a novel connector module that provides a variety of connection modes, including a jumper connection mode with other connector modules by using a simple structure.

It is also necessary to provide a connector module that allows the connector module to be connected to a particular, non-adjacent functional module without changing the basic structure of the functional module.

SUMMARY OF THE INVENTION

According to the present invention a novel connector module structure is provided. The invented connector module is provided on a system and can be connected to at least one functional module. The connector module also provides a lateral connection function, such that one of its connection terminals can be electrically connected to a particular connection terminal or particular connection terminals in one or more adjacent or non-adjacent connector modules.

According to an embodiment of the present invention, the connector module comprises:

an insulation body in which a slot is provided; and a plurality of conductive pieces arranged in the slot, each conductive piece comprising a body, a pair of first direction clamping legs and at least one second direction pin, and attached to the insulation body with the body and/or the second direction pin;

wherein a third direction through-hole is provided in the insulation body at a position corresponding to a particular conductive piece, to allow an elongated object to pass through and to form a direct or indirect contact with the conductive piece.

In the preferred embodiments of the present invention, the third direction forms an angle with the first direction, preferably an angle of about 90 degrees. In some embodiments of the present invention, the first direction is substantially opposite to the second direction.

The connector module may include a blade. The blade comprises a main body extending along the third direction, a front portion at one end of the main body and a pair of clamping legs at the other end of the main body, wherein the clamping legs are configured to hold an object with a shape similar to the front portion. The blade further comprises at least one insulation block for movably mounting on the main body. The insulation block provides at least one insulation surface which, when mounting on the main body, blocks an electrical contact of the blade and a particular conductive piece, after the blade is inserted in the through-hole of the insulation body. The insulation block may further comprise a non-insulation surface which, when mounting on the main body, does not block an electrical contact of the blade and a particular conductive piece, after the blade is inserted in the through-hole of the insulation body. When without the insulation block mounting on the blade, the blade forms electrical contact with a particular conductive piece, after the blade is inserted in the through-hole of the insulation body. When the insulation block is mounted on the blade, the blade forms electrical contact with a particular conductive piece, after the blade is inserted in the through-hole of the insulation body, with the non-insulation surface facing the particular conductive piece.

The insulation block may facilitate positioning of the blade in the through-hole to ensure the relative position of the blade with a particular conductive piece.

The length of the blade may be at least the sum of a width of several connector modules. In an embodiment of the present invention, a comb-shaped blade module is provided and comprises a modular body and a plurality of blades extending in a direction at an angle to the longitude of the module body. Each blade comprises a main body, a front portion at one end of the main body and a pair of clamping legs at the other end of the main body. The clamping legs are configured to hold an object with a shape similar to the front portion.

The insulation block of the present invention may also include a plurality of insulation units, connected to form a bar. Each insulation unit comprises a removable insulation surface on both sides. When any insulation surface is removed, a non-insulation surface is formed on the corresponding side.

The present invention also provides a connector assembly comprising a connector module according to the aforementioned embodiments and a housing to accommodate the connector module. In the assembly, at least three connector modules are closely arranged in the third direction, with their through-holes aligned linearly.

These and other objectives and advantages of this invention may be clearly understood from the detailed description by referring to the following drawings.

DETAILED DESCRIPTION OF THE INVENTION

In the followings, the connector module and its connector blade of the present invention will be described by using its several embodiments. It shall be appreciated that description of the embodiments serves merely to illustrate the basic structure and spirit of the present invention. They shall not be used to limit the scope of protection of this invention.

Figure 1:
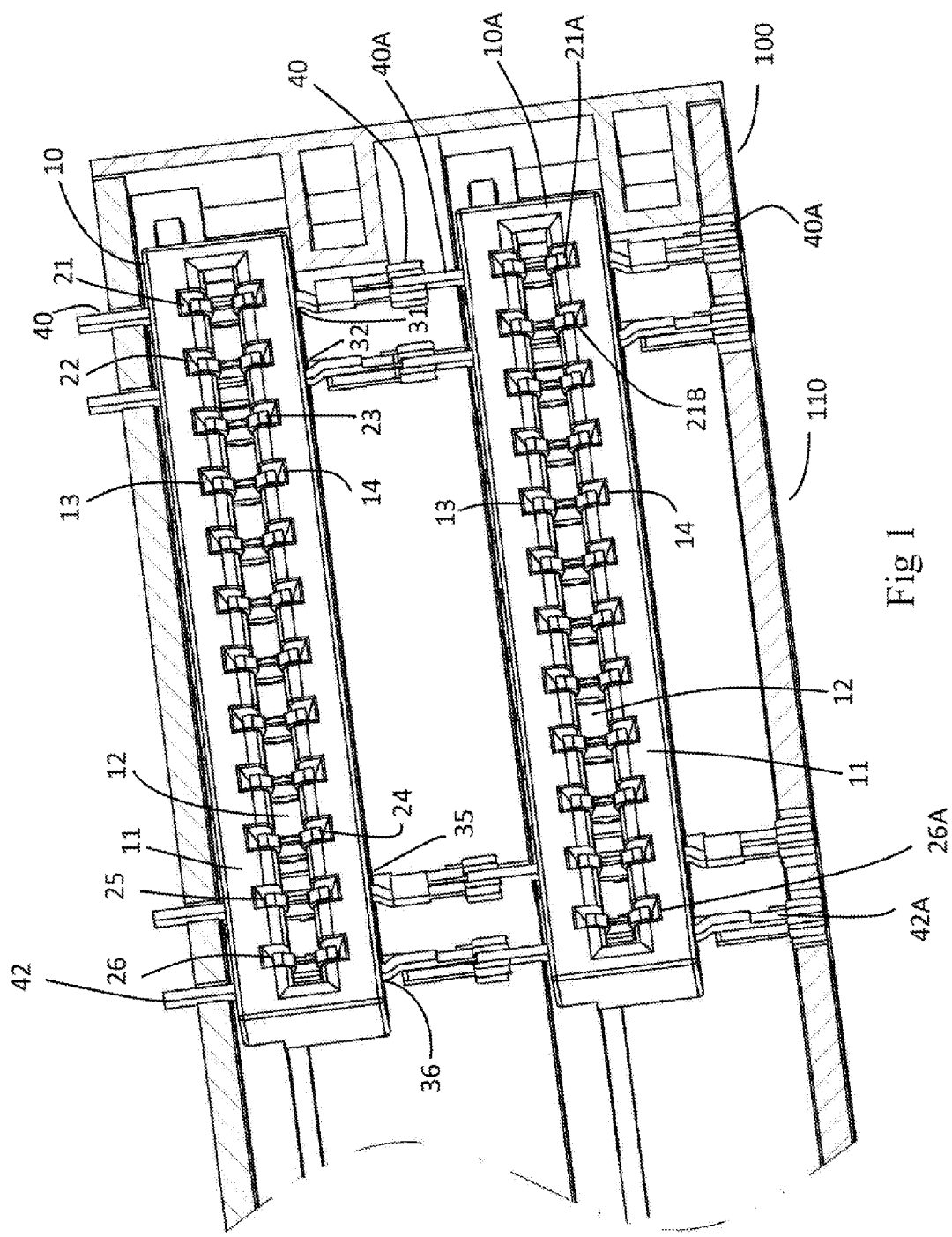
FIG. 1 shows an application schematic of an embodiment of the connector module of the present invention.

FIG. 1 shows an application schematic of an embodiment of the connector module of the present invention. As shown in FIG. 1, one of the main functions of the connector module of the present invention is to provide a jumper connection, i.e., a connection to a non-adjacent specific function module/connector module. A connector assembly 100 is shown in FIG. 1. The connector assembly 100 has a plurality of connector modules 10, 10A disposed within a housing 110. Each of the connector modules 10, 10A includes an insulation body 11 which provides a slot 12 in which plural pairs of opposing recesses 13, 14 are formed to accommodate a plurality of connection terminals 21, 22, 23, 24, 25, 26, respectively. The insulation body 11 and the slot 12 together with the connection terminals 21, 22, 23, 24, 25, 26 form a connector module, which is generally referred to as a "gold finger connector." The structure, principle and application of this type of connector are already known in the field. Details thereof may thus be omitted.

It is also shown that each of the connector modules 10, 10A has a plurality of through-holes 31, 32, 35, 36 on both sides thereof. Each of the through-holes 31, 32, 35, 36 extends through the connector module 10, 10A, i.e., extending from one side of the connector module 10, 10A through the slot 12 to the other side (see FIG. 4). A blade 40 may be inserted from one side of the through-holes 31, 32, 35, 36 and extend from the other side. The blade 40 contacts the respective connection terminals 21, 22, 25, 26 after insertion. The shape of the blade 40 is configured to be connected to another blade 40A. In the application example shown in FIG. 1, the blade 40 inserted in the connector module 10 may form connection with one other blade 40A inserted in the adjacent connector module 10A. In this example, blade 40 is in contact with connection terminal 21 in the connector module 10 and blade 40A is in contact with connection terminal 21A in the connector module 10A, while blades 40 and 41 are connected. Thus, blades 40 and 40A can electrically connect connection terminals 21 and 21A in series. FIG. 1 also shows that blade 42 is in contact with connection terminal 26 in the connector module 10 and that blade 42A is in contact with connection terminal 26A in the connector module 10A, while blades 42 and 42A are connected. Thus, blades 40 and 40A can electrically connect connection terminals 26 and 26A in series.

In the example shown in FIG. 1, the number, shape, size and position of the connection terminals, the through-holes, etc. provided in the slot 12 are not any technical limitation. They may be determined according to need when application. However, the connection terminals 21, 22, 25, 26 preferably have a clamping ability to hold a conventional gold finger to form a stable electrical connection.

In FIG. 1, the two connector modules 10, 10A are arranged next to their sides, and their through-holes 31, 32, 35, 36 are aligned with each other. However, it is appreciated by those skilled in the art that, if two connection terminals in adjacent connector modules are to form electrical contact, only the through-holes in the two adjacent connector modules need to be in alignment, or alternatively the through-holes need only be provided in the two adjacent connector modules. If connection terminals in an array of three connector modules are to form electrical contact, only the through-holes in the three adjacent connector modules need to be in alignment, or alternatively the through-holes need only be provided in the three adjacent connector modules. In the latter case, the insulation block of the present invention is so arranged that, when the insulation block is mounted on a blade inserted in the central connector module, the connection terminals of the connector modules on both sides form electrical connection with each other via a blade inserted therein and in connection with the central blade, other than with the connection terminal of the central connector module. In addition, the through-hole can be provided for selected connection terminals, only, or for all connection terminals. As long as no blade is inserted in respect to a particular connection terminal, or an insulation block is mounted on an inserted blade, the connection terminal will not form electrical connection with a connection terminal in another connector module via the blade.

Figure 2:
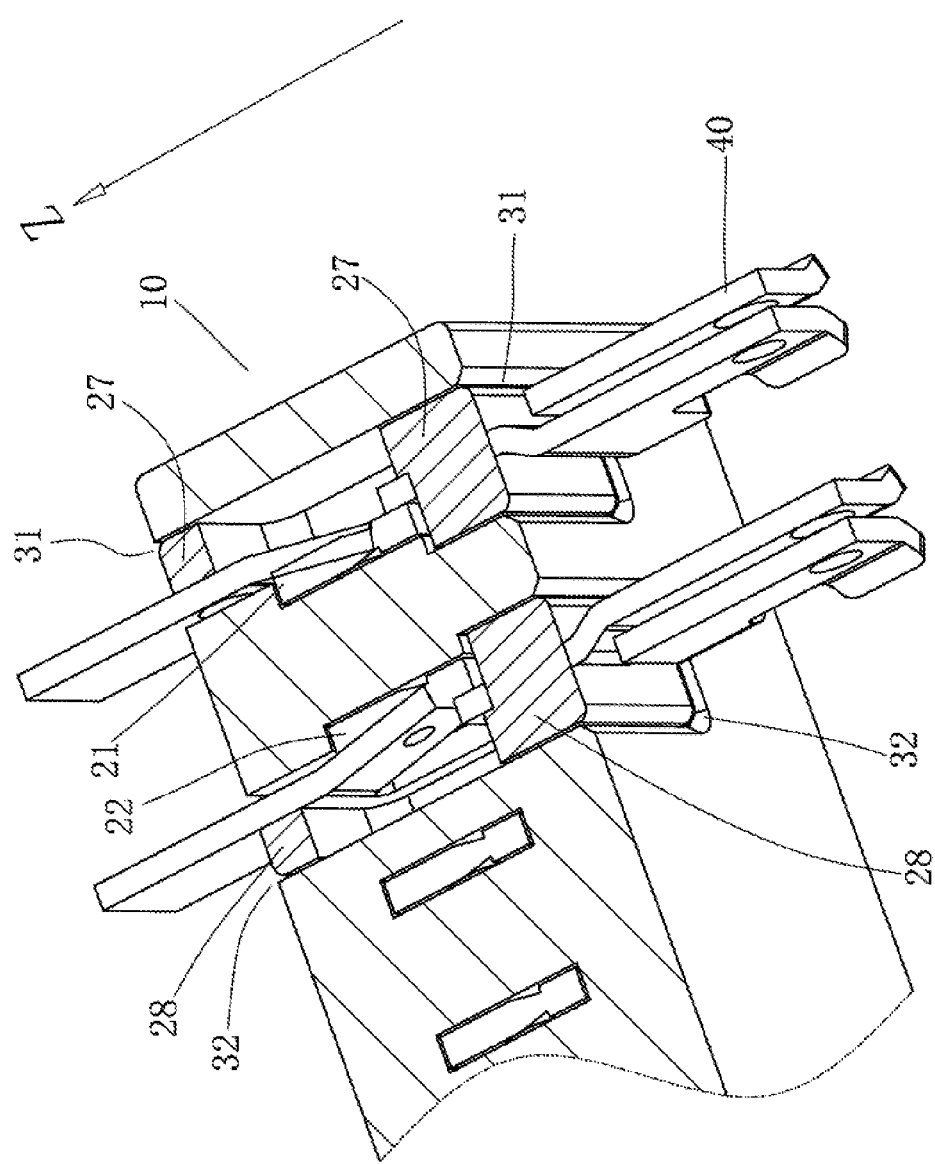
FIG. 2 shows a cross-sectional view of an embodiment of the connector module of the present invention.

FIG. 2 shows a perspective cross-sectional view of an embodiment of the connector module of the present invention. For the convenience of understanding, in the figure, shown is the case where the upper half of the connector module 10 is cut off. This figure shows the relative positions of the blade 40 and the through-holes 31, 32 and the connection terminals 21 and 22, after the blade 40 is completely inserted into the through-holes 31, 32.

The connector module 10 shown in FIG. 2 may be used in the motherboard (not shown) for a control system, to connect a functional module (not shown) to the system. Although the system motherboard and the function module are not shown in the figure, those skilled in the art would appreciate that the system motherboard can be located below the connector module 10 (lower parts in the figure) and the function module is also formed on a circuit board, with a specific edge area, in particular an extruded portion, of the circuit board assigned to provide an array of gold fingers. The gold fingers may be inserted into the slot 12 of the connector module 10, such that each gold finger is aligned with, then contacts, one of the connection terminals 21, 22, 23, 24, 25, 26. As a result thereof, the functional module and the system form electrical connection via the connector module 10.

In a particular example of the present invention, however, the connector module 10 does not form electrical connection with the system motherboard and is merely a connector module for forming an electrical connection with a functional module inserted therein and, via the blade, with another functional module that is plugged on another connector module that has the same or similar designs.

Regardless of the application, the connector module 10 of the present invention provides a lateral connection function for electrically connecting its connection terminals with particular connection terminals in one or more adjacent or non-adjacent connector modules. The non-adjacent connection will be referred to as "jumper connection" in this disclosure.

In order to provide the above-described functions, according to a preferred embodiment of the present invention, a slot 12 is provided in the insulation body 11 of the connector module 10, and a plurality of connection terminals 21, 22, 23, 24, 25, 26 is arranged in the slot 12, in an array for forming a contact with a plurality of corresponding contact pins, such as the aforementioned gold fingers, on a functional module to be inserted. The connection terminals 21, 22, 23, 24, 25, 26 are electrically conductive and are preferably resilient. The connection terminals 21, 22, 23, 24, 25, 26 are formed with conventional conductive pieces. Suitable materials include various conductive materials such as copper, brass, iron, stainless steel, aluminum or the like, or a structure in which a conductive material is coated on the surface.

Figure 3:
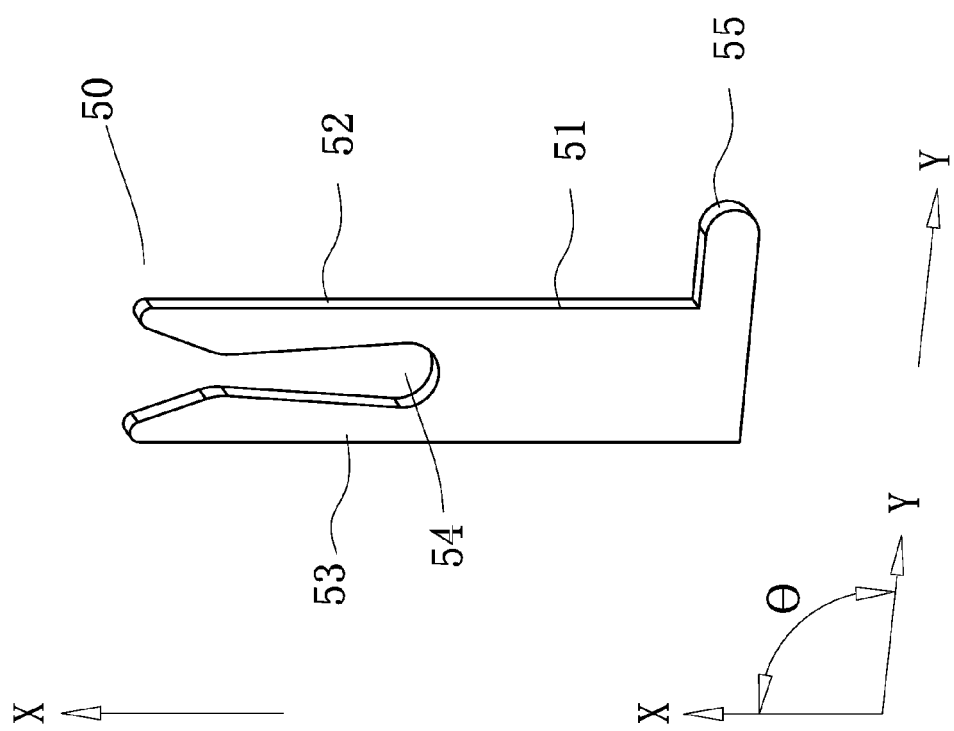
FIG. 3 shows a perspective view of a connection terminal applicable in the present invention.

FIG. 3 shows a perspective view of a connection terminal applicable to the present invention. The connection terminal shown in the figure is a conductive piece 50. The conductive piece 50 has a body 51, a pair of first direction clamping legs 52, 53 and a second direction pin 55. The conductive piece 50 may be affixed to the insulation body 11 by its body 51 and/or the second direction pin 55. The insulation body 11 of the connector module 10 is typically a block made of an insulating material such as plastic, rubber, resin, processed metal or metal oxides. Recesses 13, 14 are provided in the slots 12, in both sides, to accommodate the connection terminals 21, 22, 23, 24, 25. A conventional manufacturing method comprises the steps of arranging the connection terminals 21, 22, 23, 24, 25 and 26 in a mold, followed by filling the mold with material of the insulation body 11 to form a combination of the insulation body 11 and the connection terminals 21, 22, 23, 24, 25, 26, leaving the through-holes on both sides of the connector module. The method, process, materials and structure of the connector module are known in the field. Details thereof are thus omitted.

The clamping legs 52, 53 of the conductive piece 50 extend in the first direction X, and each pair of clamping legs 52, 53 forms a clamping recess 54 for holding a connection terminal to be inserted therein, such as the aforementioned gold finger. In particular applications, the conductive piece 50 does not form a pair of clamping legs 52, 53 in the first direction X, but rather a holding pin. A connector pin inserted into the slot 12 can be held firmly by a side wall of the slot 12 and the holding pin jointly. The second direction pin 55 extends in the second direction Y. As shown in the figure, the second direction Y is substantially perpendicular to the first direction X, i.e., angle $\theta$ formed by the first and second directions is about 90 degrees. However, those having ordinary skills in the art would appreciate that the angle $\theta$ can be any angle, including a flat angle. The second directional pin 55 may be used as a connector pin to be electrically connected to a circuit on the motherboard to which the connector module 10 is mounted, while the pin 55 may be simply a fixation means.

Now back to FIG. 2. FIG. 2 further shows the insulation body 11 is provided with through-holes 31, 32 at its sides at positions corresponding to the conductive pieces (connection terminals 21, 22). The extending direction (the third direction Z) of the through-holes 31, 32 is perpendicular to the extending direction of the clamping legs 52, 53 (the first direction X), while it can be any angle other than a flat angle. The through-holes 31, 32 allows the blade 40 to pass through and allow the blade 40 to be in direct or indirect contact with the conductive piece after insertion. The through-holes 31, 32 may also allow any elongated object other than the blade to pass through and form a direct or indirect contact with the conductive piece. The term direct contact means, for example, to cause the blade 40 to be in electrical contact with the corresponding conductive piece. The term indirect contact means, for example, that the blade 40 is in contact with the corresponding conductive piece through an object, such as the aforementioned insulation block. In this example, the extending direction of the through-holes 31, 32 is perpendicular to the extending direction of the clamping legs 52, 53 simply because the extending direction of the clamping legs 52, 53 goes upwards in the figure. When the extending direction of the clamping legs 52, 53 (the first direction X) is not upward, for example, oblique, the first and third directions do not form a right angle. That is, the angle depends on the needs of the application and is not a technical limitation.

In the through-holes 31 and 32, a stopper 27, 28 may be provided to fix the blade 40, to ensure the relative position of the blade 40 and the corresponding connection terminals 21 and 22. The stopper 27, 28 may be formed in different shape designs depending on whether or not the through-hole 31, 32 is inserted by a blade 40. The stopper 27, 28 closes the through-holes 31, 32 when the blade 40 is not inserted, and prevents dust, insects, debris, etc. from entering.

Figure 4A:
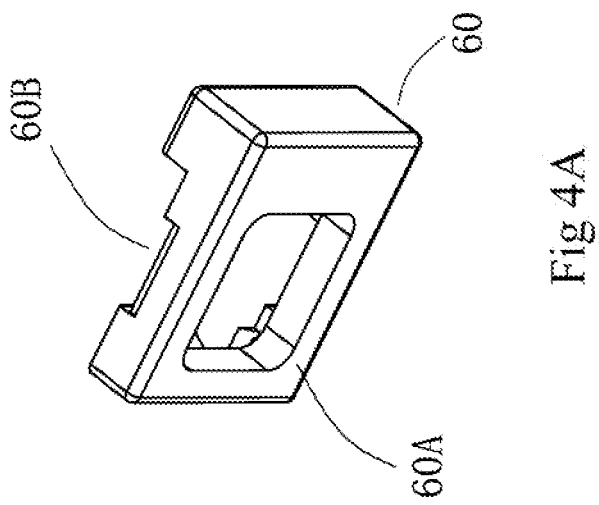
FIG. 4A is an enlarged view of its insulation block.
Figure 4:
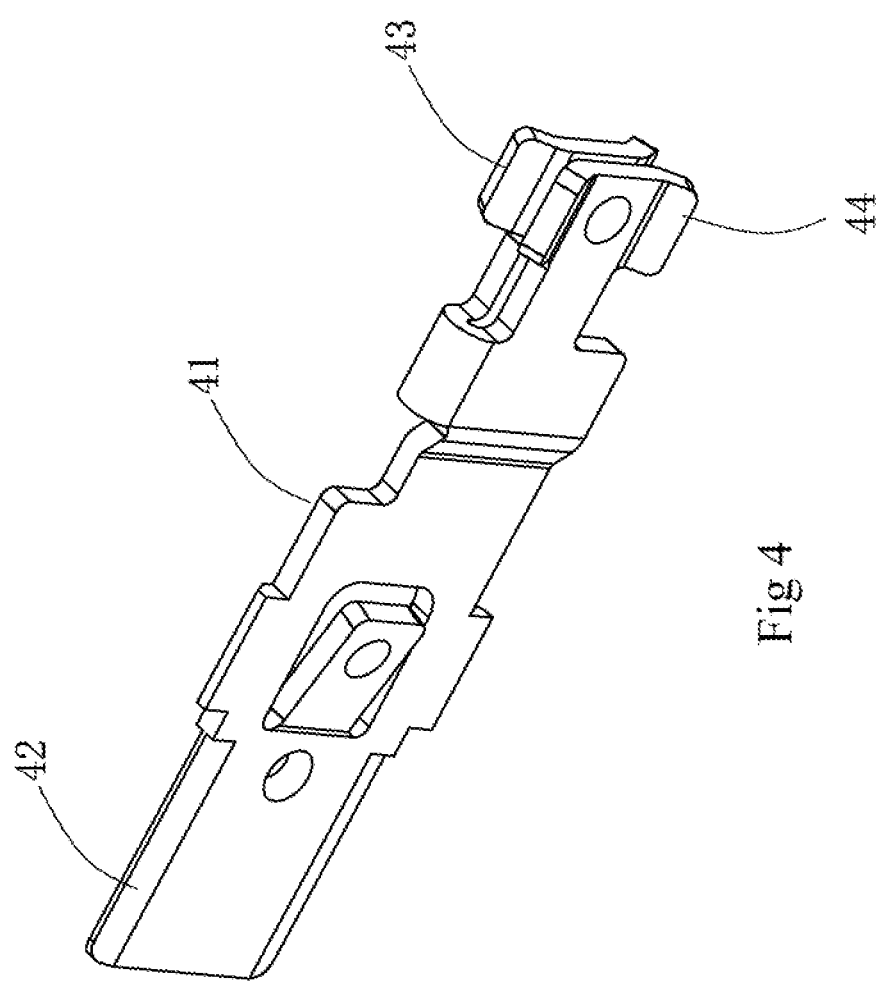
FIG. 4 shows a perspective view of a blade applicable to the connector module of the embodiment of FIG. 2

The present invention utilizes a blade 40 to define the electrical contact relationship of different connector modules. FIG. 4 shows a perspective view of a blade applicable to the connector module of the embodiment of FIG. 4 and FIG. 4A is an enlarged view of the insulation block. As shown in FIG. 4, the blade 40 includes a main body 41 extending along the third direction and a front portion 42 at one end of the body and a pair of clamping legs 43, 44 at the other end of the body. In the example of FIG. 2, the legs 43, 44 form opposing conductive pieces, and the spacing between the two can be used to hold an object. According to the invention, the shape of the legs 43, 44 is configured to hold an object that has a shape similar to that of the front portion 42, to be specific, the front portion of another blade. In a particular example of the present invention, the front portion 42 may also form a pair of clamping legs, for example, in the same shape as the clamping legs 43, 44, to hold the clamping legs at the front portion of another blade. In the embodiment of FIG. 4, a section of the body 41 of the blade 40 is formed with a raised portion to improve the contact stability with the conductive piece 50 (connection terminal). The shape design of the blade 40 can vary depending on the convenience of use.

In the example of FIGS. 2 and 4, the length of the blade 40 is just enough for forming electrical connection for two connector modules. In other embodiment of the present invention, however, the length of the blade 40 is sufficient for forming electrical connection for more than two connector modules, such as three, four and the like. In these cases, the length of the blade is at least a sum of the width of a plurality of connector modules.

One or more insulation blocks 60 work with the blade 40 to determine whether the blade 40 is in direct contact (electrical contact) with a corresponding connection terminal 21. The insulation block 60 is a sleeve made of an electrically insulating material, and the inside thereof is provided with a hollow space with which the insulation block 60 movably jackets the main body 41 of the blade 40.

According to the present invention, the insulation block 60 is provided with an insulation surface 60A and/or a non-insulation surface 60B. The insulation surface 60A may include an insulation piece. The insulation block 60 is mounted on the main body 41 of the blade 40 such that the insulation surface 60A faces the corresponding connection terminal 21 and the blade 40 is inserted into the through-hole 31 of the insulation body 11. In this manner, the insulation surface 60A can block the blade 40 from forming an electrical contact with the corresponding connection terminal 21. The non-insulation surface 60 of the insulation block 60 may include an opening. The insulation block 60 is mounted on the main body 41 of the blade 40 such that the non-insulation surface 60B faces the corresponding connection terminal 21, and the blade 40 Is inserted into the through-hole 31 of the insulation body 11. In this manner, the non-insulation surface 60B does not block the blade 40 from forming an electrical contact with the connection terminal 21, whereby they form an electrical contact therebetween. In addition, the blade 40 may be inserted into the through-hole 31 of the insulation body 11 without the insulation block 60 mounted thereon. At this time, since there is no insulation surface 60A blocking, the blade 40 is in electrical contact with the connection terminal 21. The blade 40 may be inserted into the through-hole of the insulation body with the insulation block mounted thereon. By changing the orientation of the non-insulation surface is possible to determine the contact situation of the blade 40 and the conductive piece.

The insulation block 60 may be in a form-fit with the shape of the through-holes 31, 32, 35, 36 to provide a support function to secure the blade 40 to the through-holes 31, 32, 35, 36 and to ensure the relative position of the blade 40 with a particular conductive piece (i.e., its connection terminals 21, 22: 25, 26).

The insulation block 60 may also be formed with a bag body having a frame. An insulation piece is formed on the frame on both sides of the insulation block 60 and the insulation piece can be removed by bending and breaking it with respect to the frame. An insulation block 60 having a variable contact can be formed. In other words, after removing the insulation piece on one side, the side forms a non-insulation surface, providing direct contact or electrical contact between the blade and the conductive piece. When the insulation piece is not removed, the side forms an insulation surface, providing indirect or non-electrical contact between the blade and the conductive piece.

In some embodiments of the present invention, the insulation block 60 is not required. For example, in one of the foregoing embodiments, the main body of the blade 40 includes a raised portion. Therefore, it is possible to determine whether or not the blade 40 is in electrical contact with the specific connection terminals 21, 22, 25, 26 by changing the orientation of the raised portion of the body.

A plurality of blades 40 is connected in series and inserted in a series of aligned through-holes of the connector modules 10. By varying the orientation of the insulation surface of the insulation block 60, or the orientation of the raised portion of the blade 40, It is possible to define the electrical connection of the blade 40 and particular connection terminals of a plurality of contactor modules 10 that are arranged side by side in an array. The jumper connection of connection terminals provided by the present invention is thus achieved. The electrical contacts/connections so formed are not limited to the connection of adjacent two modules, but also the connection of non-adjacent modules.

As described above, the length of the blade 40 is not limited to a sufficient length to connect two adjacent connector modules. A blade with a length sufficient to connect more than two adjacent connector modules can be inserted in multiple connector modules.

Other embodiments of the present invention also include a comb-shaped blade module. The blade module may include a modular body and a plurality of blades extending in a direction at an angle to the longitude of the modular body. Each blade comprises a main body, a front portion at one end of the main body and a pair of clamping legs at the other end of the main body. The clamping legs are configured to hold an object with a shape similar to the front portion. Each of the blade forms a raised portion at a position corresponding to conductive pieces located in one or more conductor modules, to form a direct contact or indirect contact with each of the conductive pieces.

In the applications described above, the insulation block 60 may also include a plurality of insulation units, connected to form a long bar, and each insulating unit includes a removable insulation surface on each side. When an insulation surface is removed, a non-insulation surface is formed.

The connector module as described above provides jumper connection for non-adjacent connector modules, i.e., forming electrical connections for a first connector module with a third connector module passing over a second connector module arranged between the first and the third, without changing the structure of the conventional connectors, such as the conventional gold finger type connectors. There is almost no limit on the number of connector modules that can be connected, greatly improving the connection capability and freedom of the connector module.

What is claimed is:

1. A connector module, comprising:
   an insulation body in which a slot is provided; and
   a plurality of conductive pieces arranged in the slot, each conductive piece comprising a body, a first direction clamping leg extending in a first direction and at least one second direction pin extending in a second direction, and attached to the insulation body with the body and/or the second direction pin; and
   at least one blade,
   wherein a third direction through-hole extending in a third direction is provided in the insulation body at a position corresponding to a particular conductive piece, to allow an elongated object to be inserted through in the third direction and to form a direct or indirect contact with the conductive piece;
   wherein the third direction forms an angle with the first direction;
   wherein the angle formed by the third direction and the first direction is about 90 degrees; and
   wherein the blade comprises a main body extending along the third direction, a front portion at one end of the main body and a pair of clamping legs at another end of the main body, wherein the clamping legs are configured to hold an object with a shape similar to the front portion and wherein the main body of the blade comprises a raised portion; a status of connection between the blade and a particular conductive piece being determined by an orientation of the raised portion of the raised portion when inserted in a through-hole.

2. The connector module of claim 1, wherein the first direction is substantially opposite to the second direction.

3. The connector module of claim 1, wherein the first direction clamping leg comprises a pair of clamping legs.

4. The connector module of claim 1, wherein the front portion of the blade forms a pair of clamping legs.

5. The connector module of claim 1, wherein a length of the blade is at least a sum of a width of a plurality of connector modules.

6. A connector assembly, comprising a connector module of claim 1 and a housing to accommodate the connector module; wherein at least three connector modules are closely arranged in the third direction, with their through-holes aligned linearly.

7. A comb-shaped blade module for a connector module of claim 1, comprising:
   a modular body;
   a plurality of blades extending in a direction at an angle to the longitude of the module body;
   wherein each blade comprises a main body, a front portion at one end of the main body and a pair of clamping legs at another end of the main body, wherein the clamping legs are configured to hold an object with a shape similar to the front portion; and
   at least one insulation block comprising a plurality of insulation units, connected to form a bar; wherein each insulation unit comprises a removable insulation surface on each side.

8. The comb-shaped blade module of claim 7, wherein the insulation unit is formed with a bag body having a frame, wherein an insulation piece is formed on the frame on each side of the insulation block.

9. The comb-shaped blade module of claim 7, wherein the front portion of the blade forms a pair of clamping legs.

10. A connector module, comprising:
    an insulation body in which a slot is provided;
    a plurality of conductive pieces arranged in the slot, each conductive piece comprising a body, a first direction clamping leg extending in a first direction and at least one second direction pin extending in a second direction, and attached to the insulation body with the body and/or the second direction pin; and
    at least one blade,
    wherein a third direction through-hole extending in a third direction is provided in the insulation body at a position corresponding to a particular conductive piece, to allow an elongated object to be inserted through in the third direction and to form a direct or indirect contact with the conductive piece;
    wherein the third direction forms an angle with the first direction;
    wherein the angle formed by the third direction and the first direction is about 90 degrees; and
    wherein the blade comprises a main body extending along the third direction, a front portion at one end of the main body and a pair of clamping legs at another end of the main body, wherein the clamping legs are configured to hold an object with a shape similar to the front portion and wherein the blade forms a direct contact or an indirect contact with a particular conductive piece when inserted in a through-hole.

11. The connector module of claim 9, wherein the front portion of the blade forms a pair of clamping legs.

12. The connector module of claim 10, further comprising at least one insulation block for movably mounting on the main body of the blade; wherein the insulation block provides at least one insulation surface to block a contact between the blade and a particular conductive piece when the insulation block is mounted on the main body of the blade and the blade is inserted in a through-hole of the insulation body.

13. The connector module of claim 12, wherein the insulation block further comprises a non-insulation surface to allow a contact between the blade and a particular conductive piece when the insulation block is fitted on the main body of the blade and the blade is inserted in a through-hole of the insulation body.

14. The connector module of claim 12, wherein the insulation block provides positioning of the blade in the through-hole by a form-fit with the shape of the through-hole.

15. The connector module of claim 12, wherein a length of the blade is at least a sum of a width of a plurality of connector modules and wherein the insulation block comprises a plurality of insulation units, connected to form a bar, wherein each insulation unit comprises a removable insulation piece at each side.

16. The connector module of claim 12 wherein the insulation block is formed with a bag body having a frame, wherein an insulation piece is formed on the frame on each side of the insulation block.

17. The connector module of claim 10, wherein the first direction is substantially opposite to the second direction.

18. The connector module of claim 10, wherein the first direction clamping leg comprises a pair of clamping legs.

19. A blade module for a connector module of claim 1, comprising a blade and at least one insulation block; wherein the blade comprises an elongated main body, a front portion at one end of the main body and a pair of clamping legs at another end of the main body, wherein the clamping legs are configured to hold an object with a shape similar to the front portion; and wherein the insulation block is movably mounted on the main body of the blade; wherein the insulation block provides at least one insulation surface to block a contact between the blade and an external object when the insulation block is mounted on the main body of the blade.

20. The blade module of claim 19, wherein the main body of the blade comprises a raised portion to abut the external object.

21. The blade module of claim 19, wherein the front portion of the blade forms a pair of clamping legs.

22. The blade module of claim 19, wherein the insulation block further comprises a non-insulation surface to allow a contact between the blade and the external object when the insulation block is mounted on the main body of the blade.

23. The blade module of claim 19, wherein a length of the blade is sufficient to be mounted by a plurality of insulation blocks.

* * * * *